United States Patent
Wong et al.

(10) Patent No.: US 7,502,349 B2
(45) Date of Patent: Mar. 10, 2009

(54) SYSTEM AND METHOD FOR SENDING DATA TO A MOBILE DEVICE IN A WIRELESS NETWORK

(75) Inventors: Daniel Yun-chak Wong, San Jose, CA (US); Gajendra Shukla, Sunnyvale, CA (US); Hilton Hong, San Jose, CA (US)

(73) Assignee: Proxim Wireless Corporation, Milpitas, CA (US)

( * ) Notice: Subject to any disclaimer, the term of this patent is extended or adjusted under 35 U.S.C. 154(b) by 0 days.

(21) Appl. No.: 11/604,176

(22) Filed: Nov. 22, 2006

(65) Prior Publication Data

US 2007/0127497 A1 Jun. 7, 2007

Related U.S. Application Data

(63) Continuation of application No. 10/765,562, filed on Jan. 26, 2004.

(60) Provisional application No. 60/443,114, filed on Jan. 27, 2003.

(51) Int. Cl.
*H04Q 7/24* (2006.01)

(52) U.S. Cl. ............... 370/331; 370/338; 370/328; 370/252

(58) Field of Classification Search ............ 370/338, 370/328, 400, 252
See application file for complete search history.

(56) References Cited

U.S. PATENT DOCUMENTS

| | | | |
|---|---|---|---|
| 5,457,689 A | 10/1995 | Marvit et al. | |
| 5,471,469 A | 11/1995 | Flammer, III et al. | |
| 5,559,803 A | 9/1996 | Sakai et al. | |
| 5,570,084 A | 10/1996 | Ritter et al. | |
| 5,812,531 A | 9/1998 | Cheung et al. | |
| 5,991,287 A | 11/1999 | Diepstraten et al. | |
| 6,006,017 A | 12/1999 | Joshi et al. | |
| 6,044,069 A | 3/2000 | Wan | |
| 6,256,300 B1 | 7/2001 | Ahmed et al. | |
| 6,430,172 B1 | 8/2002 | Usui et al. | |
| 6,459,691 B1 | 10/2002 | Abe | |
| 6,497,599 B1 | 12/2002 | Johnson et al. | |
| 6,529,119 B1 | 3/2003 | Kumar et al. | |
| 6,735,202 B1 | 5/2004 | Ahmed et al. | |
| 2002/0085719 A1 | 7/2002 | Crosbie | |
| 2003/0139197 A1 | 7/2003 | Kostic et al. | |
| 2003/0227911 A1 | 12/2003 | Trossen | |
| 2003/0235176 A1* | 12/2003 | Zhang et al. | 370/338 |
| 2004/0068668 A1 | 4/2004 | Lor et al. | |
| 2004/0095911 A1 | 5/2004 | Benveniste et al. | |
| 2005/0141457 A1 | 6/2005 | Lee et al. | |
| 2005/0152305 A1 | 7/2005 | Ji et al. | |

* cited by examiner

*Primary Examiner*—Charles N Appiah
*Assistant Examiner*—Randy Peaches
(74) *Attorney, Agent, or Firm*—Townsend and Townsend and Crew LLP

(57) ABSTRACT

A device for wirelessly transmitting data under a wireless protocol is contemplated. A remote wireless network device initiates a session with a network. In this manner, information is sent to a gateway associated with the access point that couples the remote wireless network device to the network. When the remote wireless network device moves, data is tunneled between the succeeding gateway and the original gateway, but for those sessions opened at the original gateway. Any sessions associated with the remote wireless network device at the new gateway are processed and maintained by the new gateway without tunneling the data.

6 Claims, 3 Drawing Sheets

SYSTEM AND METHOD FOR SENDING DATA TO A MOBILE DEVICE IN A WIRELESS NETWORK

CROSS REFERENCE TO RELATED APPLICATIONS

This application is a continuation of U.S. patent application Ser. No. 10/765,562, entitled "System and Method for Sending Data to a Mobile Device in a Wireless Network," filed Jan. 26, 2004, which claims priority based on provisional application Ser. No. 60/443,114, entitled "System and Method for Sending Data to a Mobile Device in a Wireless Network" by Hilton Hung filed on Jan. 27, 2003.

FIELD OF THE INVENTION

The present invention relates to a wireless communication system. More particularly, the present invention is related to sending data to a non-static device coupled to a wireless network.

BACKGROUND

In some wireless networks, an access point (AP) can be coupled to a variety of wireless network devices. Typically, a wireless network can allow a mobile device to send and receive data as it moves through coverage zones of the individual access points. Sometimes, the wireless network device will initiate a session with a particular gateway. The data that is transferred to the wireless network device is sent to the gateway, which then relays the data to the wireless network device. Relatedly, the data emanating form the wireless network device is sent to the initial gateway, from where it is relayed to the ultimate destination.

When the wireless network device is mobile, the wireless network device can leave the coverage zone of a particular access point, or associated gateway. The wireless network device reinitiates contact with an access point that services the new location where the wireless network device is now located. In this manner, a new gateway may be used for the communication of information to and from the wireless network device.

In many cases, a link between the old gateway and the new gateway is established. Data traffic to the wireless network device is received by the old gateway, encapsulated by the old gateway, and relayed to the new gateway. At the new gateway, the data is decapsulated, and sent to the wireless network device.

Data traffic from the wireless network device is handled in much the same way. Data from the wireless network device is relayed from the wireless network device to the current gateway. The current gateway encapsulates the data and relays it to the original gateway. At this point, the original gateway decapsulates the data and relays it to the ultimate destination.

This paradigm is used for ongoing sessions, as well as new sessions. Thus, when the wireless network device starts a link at the new location, the encapsulation and relaying of the data from the new gateway to the original gateway is undertaken.

In this manner, a single gateway acts as the central point for all communications to and from a particular wireless network device. The transferring of the data to a new gateway takes additional time and effort, especially when the wireless network device is operating with several open sessions.

Such a mechanism may be found in the use of Mobile IP, a proposal before the Internet Engineering Taskforce (IETF). Mobile IP involves the use of a "Home Agent", which is the location of the device's known IP address, and a "Foreign Agent", which knows the actual location of the device. All traffic intended for the device is sent to the Home Agent and is then "tunneled" to the Foreign Agent for delivery to the device. This same type of method can be used within a wireless LAN, without the need to use the Mobile IP protocol.

In a more trivial implementation of a tunneling system to achieve seamless subnet roaming, an administrator could be forced to assign a "Home" Gateway for each wireless user in the network. Each wireless client would then communicate to its currently local access point, which would "tunnel" the packet to the client's "Home" Gateway. However, this implementation has two major inefficiencies. First, it requires the administrator to setup a Home Gateway for each user. Secondly, and more difficult to work around, it is rather inefficient, forcing more traffic to be tunneled than necessary.

SUMMARY

A device for wirelessly transmitting data under a wireless protocol is contemplated. A remote wireless network device initiates a session with a network. In this manner, information is sent to a gateway associated with the access point that couples the remote wireless network device to the network. When the remote wireless network device moves, data is tunneled between the succeeding gateway and the original gateway, but for those sessions opened at the original gateway. Any sessions associated with the remote wireless network device at the new gateway are processed and maintained by the new gateway without tunneling the data.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

in the drawings.

DETAILED DESCRIPTION

Embodiments of the present invention are described herein in the context of a System And Method for Sending Data to A Mobile Device in A Wireless Network. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of digital systems, including hardware, software, or any combination thereof. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
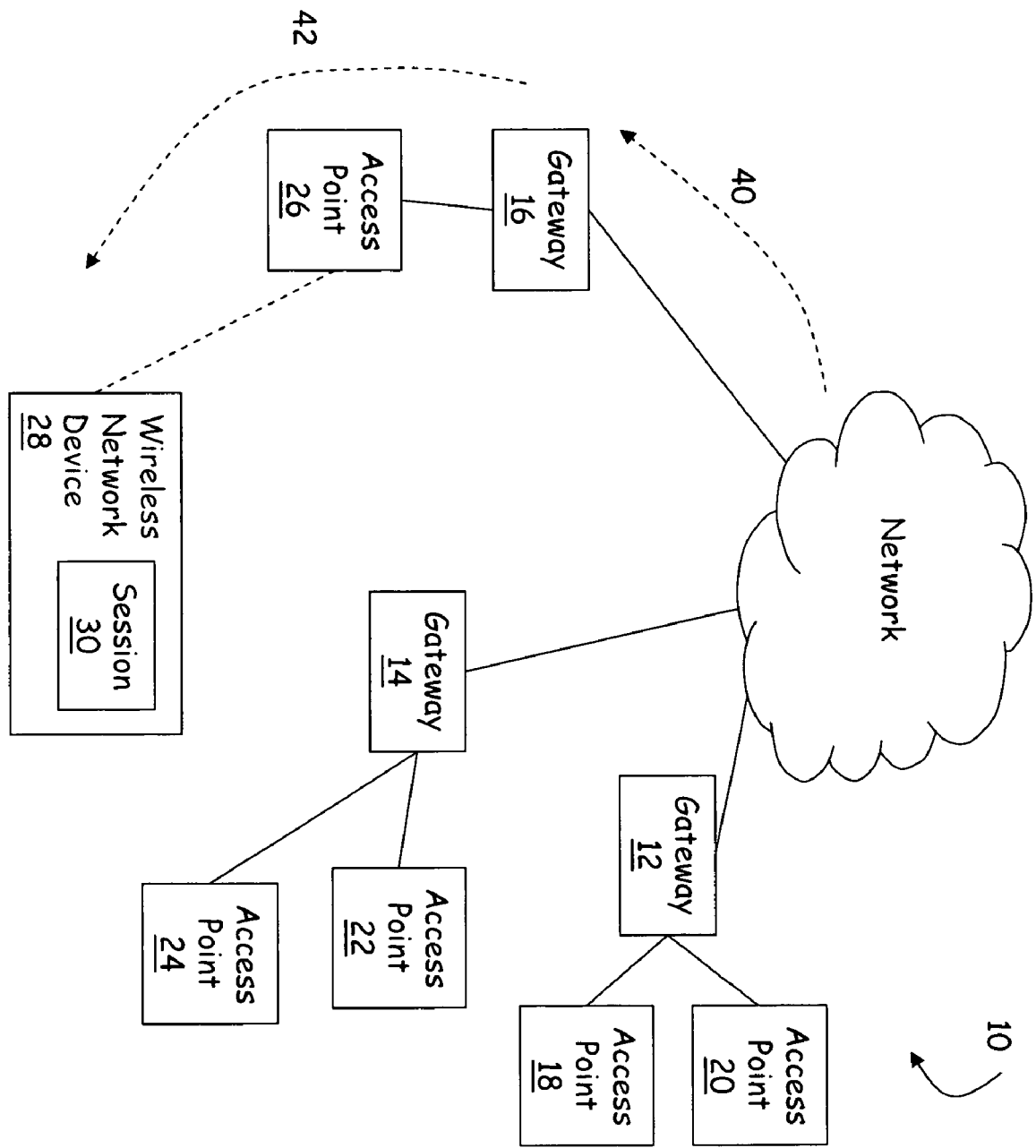
FIGS. 1 through 3 are network diagrams detailing the mechanics a wireless network with a dynamic gateway system, according to the invention.
Figure 2:
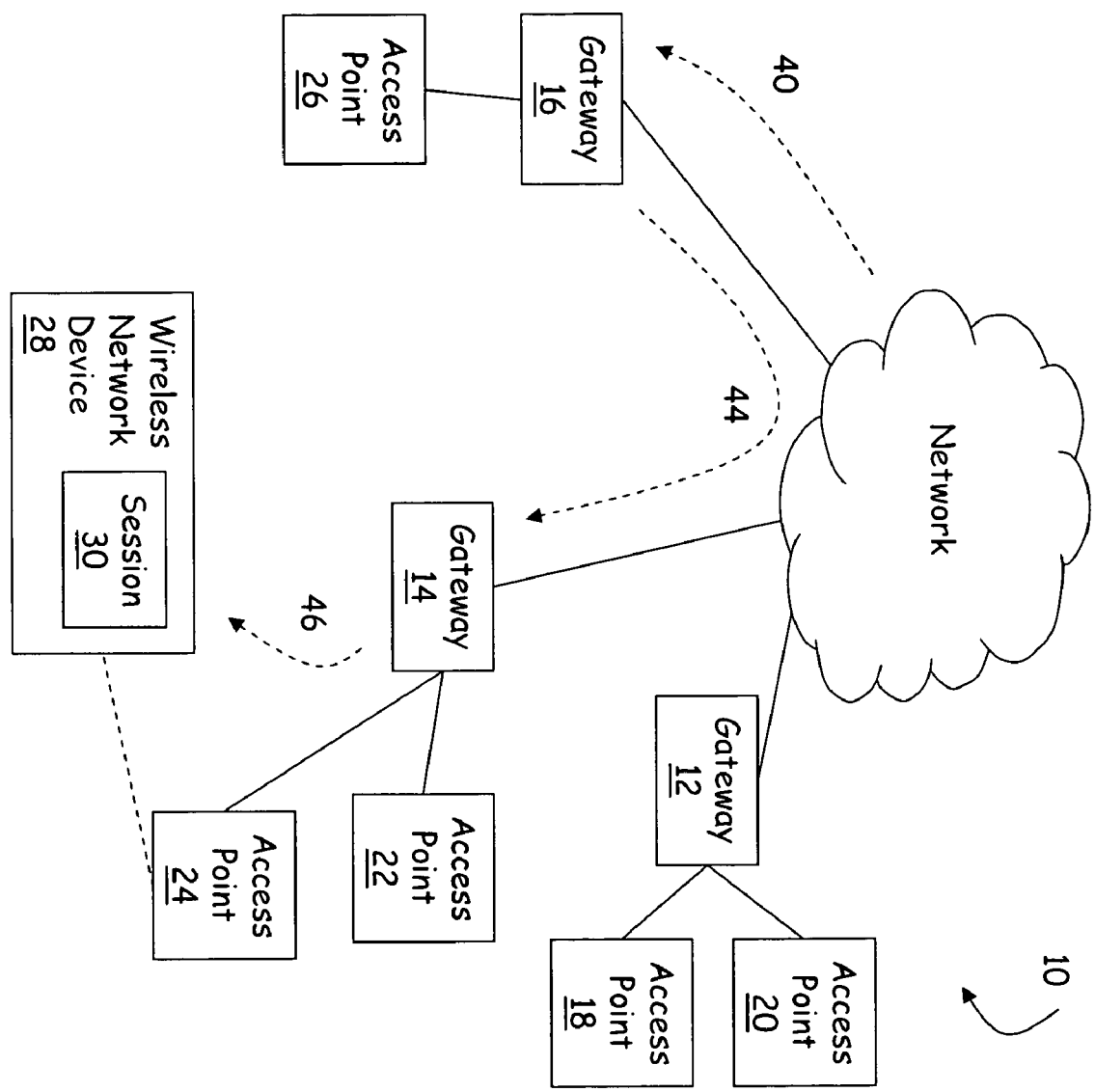
Figure 3:
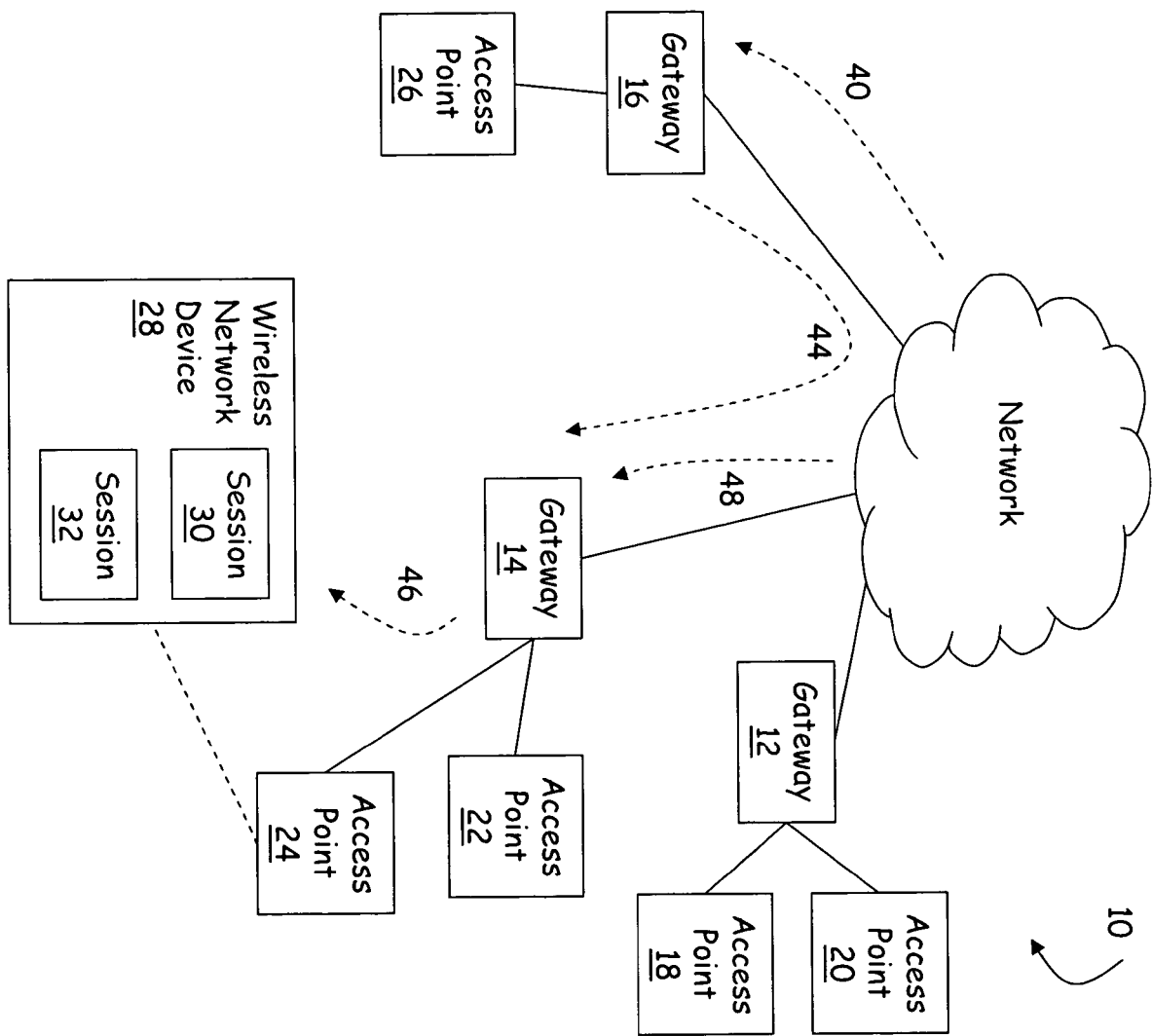

FIGS. 1 through 3 are network diagrams detailing the mechanics a wireless network with a dynamic gateway system, according to the invention. A wireless network 10 contains several functional units. These include gateways 12, 14, and 16. Access points 18 and 20 are coupled to the gateway 12. Access points 22 and 24 are coupled to the gateway 14, and an access point 26 is coupled to the gateway 16.

Assume that a wireless network device 28 makes contact with the access point 26. After making a network connection, the information for a particular session 30 initiated while in the zone serviced by the access point 26 is sent through the gateway 16. The date flow from the network is indicated by the arrow 40, and the data flow from the gateway 16 to the access point is indicated by the arrow 42.

In FIG. 2, assume that the wireless network device 28 then moves to the zone serviced by the access point 24. For the information traveling to the first session 30, the gateway 16 encapsulates the data and relays it to the gateway 14. This is indicated by the arrow 44. From there the gateway 16 relays that information to the device 28, denoted by the arrow 46.

In FIG. 3, assume that the wireless network device 28 initiates a second network session 32. The wireless network device 28 requests the new session 32 through the gateway 14. However, instead of sending the data bound for the session 32 and to the gateway 16, the gateway 14 assigns an address to the session so that the gateway 14 can directly service the second session 32. This is denoted by an arrow 48. Thus, the pathway for information for the second session 32 flows directly through the gateway 14, rather than being sent to the gateway 16, being encapsulated, and then sent to the gateway 14 for final delivery to the session 32.

In this manner, the gateway that initiates a network session from a network device may be thought of as an agent for the particular session. The gateways that the wireless network device 28 may move to will be the foreign agents for the session. Thus, when the wireless network device 28 moves, the new gateway will not have to encapsulate and deliver every single transmission emanating from the wireless network device 28 to a central gateway responsible for that client. The new gateway can send and deliver data directly to the wireless network device 28 for those sessions the new gateway initiates during the time under its aegis, rather than have another gateway encapsulating and forwarding the data.

Of course, the flow of data going from the network device 28 to the network can be treated in a similar manner. Thus, instead of the new gateway encapsulating and forwarding data to another gateway, the new gateway can initiate a direct link to the network for those sessions started on the network device 28 while that device is under the aegis the new gateway.

In a more detailed example assume that a client device associates with an access point. In this case, it might use address resolution protocol (ARP) and dynamic host communication protocol (DHCP) service to request an internet protocol (IP) address from the network. The initial gateway responds to such a request using a pool of IP addresses it has been assigned (either through prior assignment, or through any other mechanisms.)

When the client has an IP address, it can then begin an application that requires a high layer connection, such as, for example, a transport control protocol (TCP) application. Such an application might be those like an email application, a file sharing application, or a web browsing application, just to name a few.

If the client device moves to any of the other access points connected to the original gateway, only a reassociation process need take place. Other network information (like IP address, default gateway, etc.) is still valid for this access point.

When the client device roams from an access point attached to the first gateway to an access point attached to a different gateway, it is preferable to accomplish this without breaking the higher layer (e.g. TCP) connection. The gateways can inform each other that the move has occurred.

In addition to simple notification, gateways in adjacent physical locations can be kept appraised of the clients currently attached to each other. In this way, roaming can be anticipated, and the transfer of information between the gateways expedited.

In the current implementation, data from the network intended for the client continues to be routed to the original gateway. Upon receipt of the data, the original gateway forwards them to gateway that the client is now attached to. This second gateway then prepares the data for final delivery to the client.

When a client moves to a new subnet, or to a portion of network that is controlled by a different gateway, the network traffic operates for the ongoing sessions in the above-mentioned manner. Thus, when a user establishes a TCP session and then roams to a new subnet, the traffic is tunneled, in both directions between the original gateway and the new gateway.

However, in the context of the current specification, such tunneling is only carried out on an as-needed basis. The current specification offers routing optimization for mobile networking. This optimization is achieved since only the traffic from particular sessions is tunneled between gateways.

In this context, assume that the client device associates with the original gateway and starts a network application session. The client then moves to an access point attached to another gateway. When the client device moves to the new access point, it cannot receive a new IP address without breaking its ongoing application session. Thus, the gateways establish a tunnel for the traffic associated with this application session.

Assume that, when attached to the new access point, the client device starts a second network application session. The data associated with this new network application session is allowed to pass directly out to the network.

In one embodiment, the gateways map the original IP address of the client device to a new IP address on a per-session basis. That is, traffic from one session, using the original IP address, is tunneled back to the gateway. However, traffic from the new session, using a new IP address, can be routed directly to and from the network.

The invention claimed is:

1. A method for conducting wireless communication between a mobile device and a network, the method comprising:
- initiating a first session with a first gateway when the mobile device is in a first zone associated with the first gateway;
- initiating a second session with a second gateway when the mobile device is in a second zone associated with the second gateway; and
- when the mobile device is in the second zone, directly servicing the second session using the second gateway, and servicing the first session using the first gateway by passing data between the first gateway and the second gateway;
- wherein the pathway for data traffic between the mobile device and the network is based on the zone in which a session is initiated, so that if both the first and second sessions are open and being serviced when the mobile device is in the second zone, data traffic for the first session is tunneled through the first and second gateways to the network, and data traffic for the second session is passed through the second gateway to the network without being tunneled through the first and second gateways.

2. The method of claim 1, wherein one of the first and second gateways is an address allocation device.

3. The method of claim 1, wherein at the first session, the mobile device acquires an IP (internet protocol) address and establishes a higher layer network connection which is maintained at the second session.

4. The method of claim 3, wherein the first and second gateways map the IP address of the mobile device on a per-session basis so that, when the mobile device is in the second zone, data traffic for the first session is passed between the first gateway and the second gateway, and data traffic for the second session passes through the second gateway to the exclusion of the first gateway.

5. The method of claim 4, wherein the IP address of the mobile device is mapped to a new IP address for the second session when the mobile device is in the second zone, to permit data traffic for the second session to be passed through the second gateway to the exclusion of the first gateway.

6. The method of claim 1, further comprising conducting a reassociation process when the mobile device moves between the first and second zones.

* * * * *

UNITED STATES PATENT AND TRADEMARK OFFICE
CERTIFICATE OF CORRECTION

| | | |
|---|---|---|
| PATENT NO. | : 7,502,349 B2 | Page 1 of 1 |
| APPLICATION NO. | : 11/604176 | |
| DATED | : March 10, 2009 | |
| INVENTOR(S) | : Wong et al. | |

It is certified that error appears in the above-identified patent and that said Letters Patent is hereby corrected as shown below:

Column 2, line 29, delete "in", and insert --In--.

Signed and Sealed this

Fourteenth Day of July, 2009

JOHN DOLL
*Acting Director of the United States Patent and Trademark Office*